Nov. 16, 1971   K. H. STIER   3,619,905
GYRO COMPASSES
Filed May 13, 1968                                           3 Sheets-Sheet 1
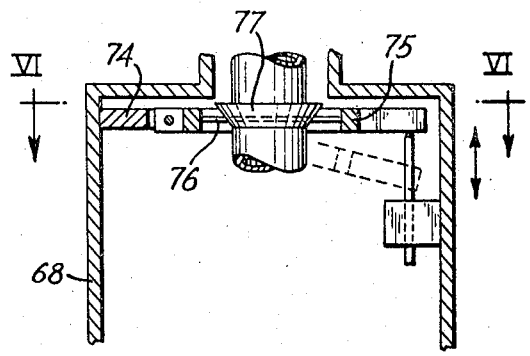
FIG.1                          FIG.5
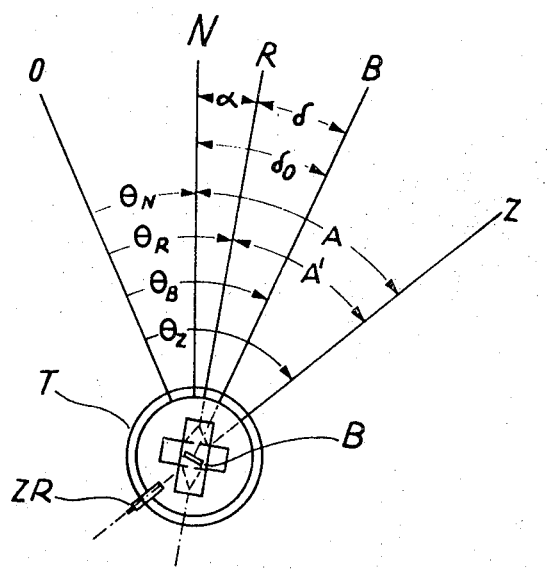
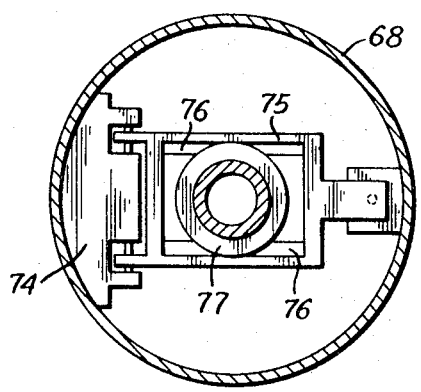
FIG.6
INVENTOR
KARL HEINRICH STIER
BY Wilson & Fraser
ATTORNEYS

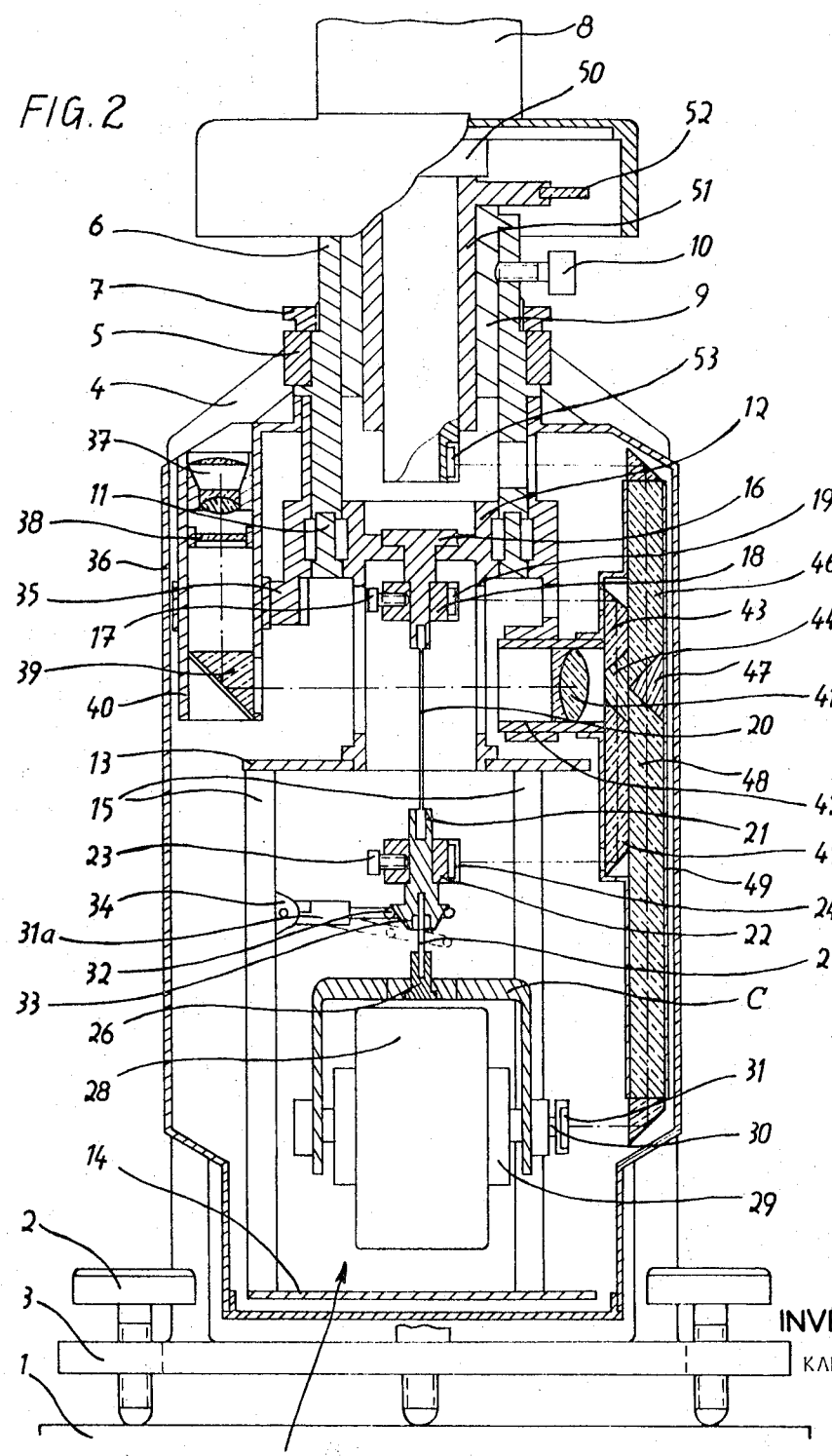

INVENTOR

KARL HEINRICH STIER

BY Wilson + Fraser
ATTORNEYS

3,619,905
GYRO COMPASSES
Karl Heinrich Stier, Hugo-Schultz-Strasse 55,
Bochum, Germany
Filed May 13, 1968, Ser. No. 728,461
Claims priority, application Germany, May 13, 1967,
St 26,875, St 26,876
Int. Cl. G01c 19/38, 1/02
U.S. Cl. 33—72      10 Claims

ABSTRACT OF THE DISCLOSURE

A gyro compass in which one embodiment has an inner gimbal suspended between two band systems of varying restoring torques which can be selectively damped. On the band systems are mounted mirrors, having normals capable of coincidence with optical path of a prism arrangement with enables the autocollimating telescope to optically sight on the mirrors. The combination of the band systems and the mirror results in the capability to find the null position for the compass faster than in a liquid damped compass while retaining the greater accuracy of the liquid damped compass over that of the undamped compass of prior art.

BACKGROUND OF THE INVENTION

A conventional gyroscope may typically contain an asynchronous or a synchronous motor, the rotor of which is disposed exteriorly of the stator and functions as a flywheel operating on a spinning axis. The bearings of said axis are mounted in a case or housing enclosing the flywheel. The case or housing effectively operates as the inner gimbal. In such structures, it is known that the suspension of the gyroscope pendulously with one metal band of rectangular cross section on its case produces a torque of torsion about the vertical axis, the restoring torque of which is a function of the angle of deflection from the torsion torque zero position, in which the band is untwisted.

To eliminate the undesired effect of this restoring torque of the band, there have been developed methods of measurement up to date which require the operator to seek the direction of the spin axis of the inoperative gyro in the torsion torque zero position of the band. The direction will be found in a manner known in the art as a reading of the circle of the cooperating angle measuring instrument, for example of the azimuth circle of a theodolite, which is fixed on the outer gimbal.

If the inoperative gyro is released from its locked position, oscillations will arise about the vertical axis because a small torsion will usually be exerted on the band by locking it in the inoperative position. The spin axis oscillates in the horizontal plane about the torsion torque zero position.

The period of oscillation is from 1 up to 6 minutes depending upon the construction of the instrument. To observe a number of reversal positions requires an undesirably long time. The reversal positions can be picked off by turning the autocollimating telescope coinciding with the normal of the mirror fixed on the inner gimbal or case of the gyro in a manner known in the art. If the autocollimating telescope is coupled with or fixed on the alidade of the theodolite every reversal position can be read off of the circle. By computing the mean of the circle readings of the reversals left and right, the circle reading of the torsion torque zero position is found.

Two known methods are popularly used for the elimination of the band torsion torque. The first one is used for compasses of a construction from which results a very small value of the ratio of the band torsion torque to the gyro torque of the gyroscope, such as 1:1000 up to 1:10000. Hereby it is required only to set and fix the torsion torque zero position by turning of the upper clamp of the band relative to the outer gimbal in a direction known to be generally the meridan direction. Such compass construction results in a big instrumet of the floating type with a long period such as 15 up to 25 minutes of the oscillation of the running gyro about the vertical axis, and therefore, a long time of measurement, for example, one hour, to seek North by observing a number of reversal points. The second method is used for smaller instruments of the non-floating type. Their construction results in a greater value of the ratio of the band torsion torque to the gyro torque of the gyroscope such as 1:1 up to 1:20 and a period of 5 up to 10 minutes of the oscillation of the running gyro. Hereby it is required to turn the upper clamp of the band and, therefore, the torsion torque zero position manually or by a servo motor in accordance with the oscillation of the gyroscope about the vertical axis. The time of observing a number of reversal points to compute the direction of true North will be 15 to 30 minutes. The accuracy of the determination of the direction of true North with the first mentioned type is up to date 10 to 15 seconds of arc, with the second mentioned type, 15 to 30 seconds of arc.

The present invention relates to gyro compasses for direction finding and surveying purposes of the type comprising a suspension system divided up into individual band systems with different restoring moments, an optical read-off system using a mirror and prisms, an autocollimating telescope, and an electronic power pack or operating means.

One object of the present invention is to improve such a gyro compass so that the time necessary for making a measurement is substantially reduced while maintaining an accuracy of 5′ to 10″ or even improving this accuracy. A further object of the invention is to reduce the time necessary for measurement to such an extent that instead of 20 to 60 minutes only 2 to 15 minutes are required.

A still further object of the invention is to provide such an improved gyro compass whose dimensions and the dimensions of its operating means are not greater than those of prior art gyro compasses, or possibly are even less.

In accordance with the invention, a gyro compass of the type referred to above has the suspension system of the gyroscope divided up into several sequentially following bands or wires of different restoring torque and arranged on the clamps of each of these bands or wires are small plane mirrors with their surface normals approximately horizontal, or a mirror fixed on the axis or on the side plane of the gyro rotor the normal of which is aligned with the spin axis.

The gyroscope is housed in an outer gimbal which can be leveled on a tripod. Pivoted in the outer gimbal is an intermediate gimbal which can be turned about the vertical axis. The inner bimbal or case is suspended from the intermediate gimbal or band head frame by metal bands or wires pendulous or centered in the vertical axis so that the spin axis of the inoperative gyro rotor is horizontal and the spin axis of the running gyro rotor seeks true North by a free or damped oscillation about the vertical axis. An autocollimating telescope with horizontal aiming axis is arranged on the outer gimbal so that it can be turned about the vertical axis relative to the outer gimbal. The telescope may also be coupled to the intermediate gimbal as an alternative. The gyro compass cooperates with an angle measuring instrument such as a theodolite and can be set working by an electric unit for control and operation with power fed by an electric power rack.

In accordance with the invention a gyro compass of the type referred to above has the suspension system divided up into several sequentially following individual band systems of different restoring force and associated with each of the holding positions a further mirror is arranged lying in the path of rays passing to the autocollimating telescope.

BRIEF DESCRIPTION OF THE DRAWINGS

The invention will now be explained with reference to the accompanying drawings.

FIG. 1 is a diagram for providing an explanation of considerations concerning the adoption of the method of measurement to be chosen.

FIG. 2 is a partial section of an embodiment of a gyro compass in accordance with the invention.

FIG. 5 is a view on the line V—V of FIG. 3, and

FIG. 6 is a view on the line VI—VI of FIG. 5.

Figure 3:
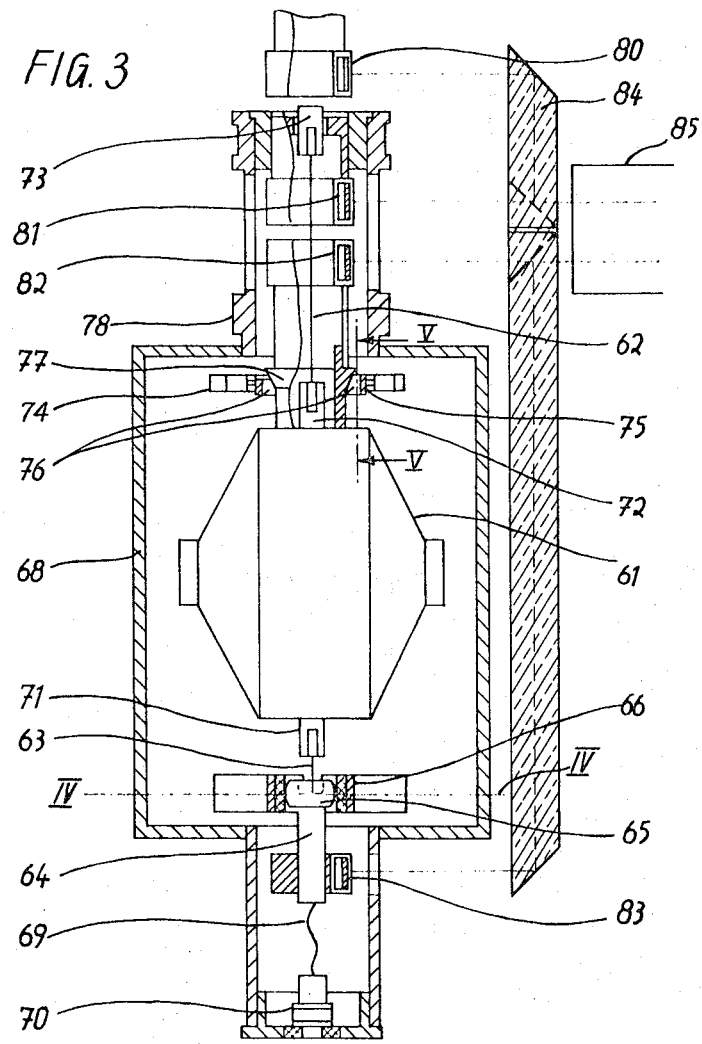
FIG. 3 is a diagrammatic section of a modified embodiment of a gyro compass in accordance with the invention.

The restoring or directing moment $M_B$ of a suspension band for the non-rotating gyro as an oscillating mass varies substantially linearly in accordance with the equation $$M_B = C \cdot \delta = \frac{c}{l} \cdot \delta \quad (1)$$

in which:

$C$=resilient characteristic of suspending or carrying band
$c$=resilient characteristic for unit length of carrying band
$l$=free length of carrying band
$\delta$=angular displacement from band null position.

The band null position is taken as the position of the gyro axis expressed as an azimuthal direction about which the oscillating "gyro-carrying band" system oscillates about the vertical after an initial displacement from balance position with the gyro not rotating. In the ideal case the system would come to rest owing to unavoidable damping. The term "band null position" also applies when use is not made of a band B with conventional rectangular cross section but of a wire with a circular or other suitable cross section as the band system. The term also applies if a number of bands or wires are employed instead of a single one since in each case an equilibrium or balance position is produced as a result of the torsion and possibly other bending restoring moments of the individual bands in the case of free oscillations about the vertical axis. The term is, finally, also taken to apply when, for example, conducting bands for a supply of current are used in a known manner with a spiral or helical shape and contribute as regards the torsion moments responsible for determining the equilibrium position.

The band null position originates from the swinging moments of the components of the apparatus and thus has no direct connection to the meridian direction which is sought. The null position of the band will therefore have a substantial influence on the determination of the meridian direction if more than negligible error is imparted because of failure to orient the band in the direction of the spin axis of the gyro. In the cases of the known methods of adjusting the band head or approximating a setting to the meridian direction, for example by means of a pilot compass in the case of equipment with suspension means, the torsion restoring moment seeking the random band null direction is 10 to the power of 3 or 4 times less than the gyro moment seeking the meridian direction. In order to determine the band null position a separate measuring procedure is necessary which takes up a substantial amount of time. In the case of higher accuracy requirements the mean has to be found from a number of measurements. In the case of equipment with a supporting liquid for relieving the suspension means it is not possible, owing to liquid damping, to find the null value (for example) by using the measuring procedure involving the determination of reversal positions about the rest position with the gyro not running.

In accordance with the preferred feature of the invention a mirror is provided on the band head in such a manner that it can be adjusted. Its normal direction is swung so as to coincide with the band null direction which is determined directly or indirectly from repeated separate measurements, and the band head is then fixed.

In the ideal case the normal direction of the mirror on the gyro should be aligned with that of the mirror on the band head and on observing the same graduation of the autocollimating telescope the two mirror images should be aligned in the two mirrors when the oscillating system is in a rest position. This is however hardly possible to achieve in practice. The band head mirror in accordance with the invention may however be said to constitute a means storing the separately determined band null position direction which does not then require measurement again in the case of each meridian determination.

The use of the band head mirror in combination with the optical multiple read-off means as a further feature of the invention makes possible the application of balancing by torsion torque for the first time to determine the direction of the meridian. While with previous gyro measuring systems having band suspension systems attempts were made to obtain a relationship between the band restoring moment and the gyro directing moment, in which the band restoring or directing moment was smaller by a factor of possibly ten, ranges between 0.1 and 1 being common, the principle in accordance with the invention makes possible ranges above 1, that is to say ranges with numerical relationships of 20 or 100. In this range substantially shorter oscillation times are achieved owing to the overwhelming effect of band torsion, and as a result there are shorter measuring times without any increase in the volume or weight of the measuring system, though there are higher requirements as regards the accuracy of measurement of the null position of the band, the maintenance of the band null position and the maintenance of the parameters which determine the directional moment produced by the band. The requirements of the above case can be fulfilled by use of the principle in accordance with the invention.

The directing moment seeking the meridian direction produced by a gyro suspended with a horizontal axis in the form of a pendulum varies in accordance with the equation $$M_K = I \cdot \omega_K \cdot \omega_E \cdot \cos \varphi \cdot \sin \alpha \quad (2)$$

in which $I \cdot \omega_K = H$ ... the angular momentum
$I$=moment of inertia
$\omega_K$=angular velocity of the rotor of the gyro
$\omega_E$=angular velocity of the Earth
$\varphi$=latitude
$\alpha$=angular displacement of the direction of the axis of the gyro from the meridian direction.

The moment can be treated as being sufficiently linear only in the case of small angular displacements. Owing to the dependence on the speed of rotation of the gyro ($\omega_K = 2 \cdot \pi \cdot n_\sigma$) this moment can be influenced by the operating means for the gyro.

The ratio of the band restoring moment to the gyro directing moment is $$r = M_B / M_G \quad (3)$$

If the band null direction B forms an angles $\delta_0$ with the meridian direction N, the axis direction of the gyro, the measuring system will swing about a resultant R whose position is in accordance with the equation $$\alpha/\delta = M_B/M_G = r \quad (4)$$

in the case of a linear treatment of $M_G$. The position of B is represented by the direction of the normal of the band head mirror and is determined via the autocollimating telescope on the indexing circle T of the apparatus.

The position of R as a calculated mean value found from observation of oscillation reversal in the direction of the normal of the gyro mirror is determined on the indexing circle T by means of the autocollimating telescope. As a result the indexing circle position N of the meridian can easily be determined from the equation $$\delta_0 = (r+1) \cdot \delta \quad (5)$$

$\alpha = \delta_0 - \delta$ if $r$ is determined from separate measurements.

Owing to the determination R and the use of the moment relationship $r$ as a basis, the present procedure amounts to balancing, which in the case of high values of $r \gg 1$ leads to short periods of vibration and to small amplitudes of vibration, and the R determination can be carried out from observations of oscillation reversal in a few minutes. As regards accuracy it can only be a question of coarse measurement of the direction of the meridian, and the procedure can be carried on further to produce a more accurate result by swinging the band null position B into the calculated N-position in order to come closer to the true N-position in a second measurement, especially since with the certainly smaller displacement $\alpha$ the linearized treatment $r$ leads to a substantially smaller error. Such second measurements with a smaller amplitude within the range of the field of view of the autocollimating telescope can be carried out with very little interference and without touching the field of view. Another method for making sure of precise results for the first measurement is the setting of the band null position for the second measurement to a symmetrical position on the opposite side of N.

The ratio or relationship $r=1$ constitutes a special case as regards measuring procedure. It makes possible determination of the position of the meridian completely without calculation, in every band null position in the linear range in the shortest conceivable measurement time from the length of half a cycle $T/2$. In this case $\alpha = \delta$ and the resultant R is equal to the bisector of the angle between the band null position B and the meridian position N. This symmetry corresponds to the undisturbed undamped amplitude of oscillation of smooth release from the band null position. This particularly advantageous new method of measurement of half oscillations from the band null position into the meridian position can be used for other ratio numbers besides $r=1$. Instead of the previously used methods of conventional observation requiring several reverse positions for the determination of the mean value or for obtaining the resultant in the usual case of random amplitude of oscillation, the new method of measuring using a time of $T/2$ yields the meridian position N by the deviation of the amplitude of oscillation from the band null position B of a half oscillation started under the above conditions, after $r$ has been calculated.

A further preferred feature of a gyro compass in accordance with the invention, that is to say the use of a multi-part band system, such as a two stage band system, makes possible the achievement of a high degree of accuracy in the determination of the meridian with the same measuring instrument taking a shorter measuring time. By changing over from one band system to the other large alterations in the moment ratio are made possible so that one can for example rapidly pass from the measuring condition $r \gg 1$ to the measuring condition $r > 1$ and the advantages of both measuring conditions, that is to say the short measuring time and the higher accuracies can be employed one after the other. The switching over of the measuring condition in a multi-part band system can be enhanced by simultaneous change over in the speed of operation, for example by doubling or halving the speed of rotation if in accordance with the invention the speed of rotation of the gyro drive can be varied in steps in accordance with the locking and freezing of the individual band systems.

In addition it is possible to incorporate tuning or trimming means for compensating for the variation in the ratio number with latitude. Further the fine trimming or tuning devices of each frequency stage are to serve to supplement the limited possibilities of trimming the torsion moment in the band system in such a manner that a convenient value, such as a whole number value, can be set for the ratio number.

The band system, which is preferably made up of two parts, can conveniently be so constructed that the band head of the weaker band is so mounted in the outer frame that its head can never be set to the null position. On the bottom band end there is then suspended a further band head which as an extension of the upper band carries a further heavier band whose null position can be set by the mirror associated with this band head. In the bottom end of the latter band the inner frame carrying the gyro is suspended. The band head makes it impossible to carry out the above-mentioned procedure. The otherwise uncontrollable angular errors which would occur each time the second band head was taken hold of, are avoided by the comparison of the graduation images of the band head mirror and the gyro mirror. Further the gyro mirror is arranged so that it rotates as well as being provided in the interior of the device with a reference means which can be checked to detect variations, and it is possible to measure, by referring to this reference direction, the variations of the other read-off values on the graticule of the autocollimating telescope. The sharpness of the image of one plane mirror, which is diametrically opposite to the axis of rotation, represents a satisfactory method of checking for angular errors by observation with the autocollimating telescope which simultaneously covers the diametral areas. It should be rated that a sharp image of the index marks or graduations is only obtained if the normal of the mirror is sufficiently aligned with the axis of spin.

As a further convenient feature of the autocollimating telescope can be arranged so it can be independently swung on the frame of the gyro compass and is only coupled with the outer gimbal when it is required to swing the band null position because the outer gimbal carries the band system. It is thus necessary to provide a fine setting drive and a clamping means, together with a coupling means for making a connection with the outer gimbal, the coupling means serving for coupling and uncoupling.

A substantial advantage for achieving reliability is the direct comparsion of the mirror images of graduations, coming from different read-off positions, simultaneously in a single autocollimating telescope. In order to make it possible a suitably shaped simple or compound prismatic body is placed before the objective of the auto-collimating tubes so as to produce an optical connection with the mirrors of the different read-off points. Providing that this prismatic body forms a sufficiently rigid unit in itself, the principle of direct comparison of the mirror images is substantially ensured and alterations in the position of the autocollimating telescope in relation to the compass or with respect to the different parts of the body, therefore do not have any influence on reliability since they no longer carry constants entering into the measuring reading, as is often a disadvantage with many known types of instrument.

In FIG. 1 O denotes the start of the indexing circle while Z denotes the point of aiming and ZR denotes the aiming telescope; the remaining letters correspond to the letters in the equations.

$\alpha$ denotes the angular displacement of the direction of the gyro from the meridian direction.

$\delta$ denotes the angular displacement from the band null position.

$$r = M_B / M_K$$

N = meridian position (North)
B = band null position (stationary gyro)
R = resultant position (gyro running)
R' = resultant position in linearization with $\alpha \rightarrow \alpha'$, $\delta \rightarrow \delta'$
$\theta_B$, $\theta_R$ are to be measured and read off while $\theta_Z$ is to be calculated and set.
$\theta$ = angle on the indexing circle.

As is shown in FIG. 2 the gyro compass is mounted on a base plate 1 and is set in a horizontal position in a conventional manner by means of three foot screws 2 in the base plate 3. On the base plate 3 there are three columns 4 which have angled top parts and which carry the ring 5. The unit described forms the outer gimbal, which does not move in relation to the earth, of the instrument. This unit also includes the bearing sleeve 6 which is held in the ring 5 by the cap nut 7. In the upper part the bearing sleeve 6 serves for receiving the theodolite 8 with its spigot 9 which is held in a conventional manner by means of the clamping screw 10. In order to simplify the drawings only the foot part of the theodolite is shown. Levelling is carried out by adjustment of the foot screws 2 since there is a rigid connection between the base plate and the outer gimbal.

In the bottom part of the compass the bearing sleeve 6 and the ring 11 uniting with it receive the cylindrical support portion 12 of the band head frame or intermediate gimbal of the gyro measuring system so that it can be turned about the vertical axis. Details of the bearing means are not shown in order to simplify the drawing. A clamping device, also not shown, allows a rigid connection to be made with the bearing sleeve 6, that is to say with the outer gimbal, from the outside if required. The band head frame also includes the two plates 13 and 14 which are connected by three columns 15. In this band head frame the arresting device for the pendulum system, serving for transport purposes, is accommodated. Furthermore the band head frame also carries electric leads, not shown, for example in the form of spirals or helices for connecting the gyro motor with the gyro power pack which is outside the compass and is also not shown. These arrangements are so familiar to those in the art that illustration and more precise explanations are not required.

The upper band head 16 is fixed in the hollow cylindrical support 12 and carries the rotating mirror holder 18, which can be locked in position by means of clamping screws 17, for the first band head mirror 19. The longer and thinner band 20 with the smaller restoring or directing force, is fixed in the band head 16 and at its bottom end carries a second band head 21 which carries the second mirror holder 22 which can be rotated in relation to it and fixed by means of a clamping screw 23. On the mirror holder 22 the second band head mirror 24 is mounted. At the bottom end of the second band head 21 the shorter and thicker second band 25 with the greater restoring or directing force, for example in the form of a wire with a round cross section, emerges. The bottom end of the wire or band ends in the band mount 26 which carries the inner gimbal C in the form of a stirrup as mounted. In the stirrup C the gyro in the form of a motor with an external rotor, turning about a horizontal axis, is mounted. The gyro comprises the rotor 28, a stator 29, a rotating shaft 30 which passes through the stirrup and carries the rotating gyro mirror 31.

For determination of the meridian by means of the suspension band 25 which as a large restoring or directing force, the band 20 with the smaller restoring force is made ineffective by raising the vertically movable ring 32, carried on the lever 31a and engaging the conical part 33 of the second band head 21 so as to support it. Since the lever 31a is journalled in the bearing block 34 on one column 15, the necessary connection with the band head frame is ensured. For measurement with the band 20 with the small restoring or directing force, it is not necessary to make the band 25 with the large restoring force ineffective, since owing to its greater torsional rigidity, which exceeds that of the weaker band by a factor of ten, it is practically rigid as compared with the weaker band.

The bottom end of the bearing sleeve 6 carries by means of its external bearing sleeve 35 the autocollimating device and a housing 36 which protects the autocollimating device and the gyro measuring system in the outer gimbal together with the band head frame and, together with further casings, not shown, provides a shield against disturbing magnetic fields. The details of the mounting in the bearing sleeve 6 are not shown, in order to make the drawing more readily intelligible. The unit comprising the shielding means can be turned about the vertical axis independently from the band head frame and can be set by means of a position drive in relation to the outer gimbal and fixed in relation to the outer gimbal by means of clamping screws. Moreover, if required, it can be coupled so as to entrain the band head frame. These operating means which can be externally actuated are known as such and therefore do not require to be illustrated.

The autocollimating device is made in two parts and consists of the eyepiece 37, the graticule 38, the reflecting prism 39 in the tube 40, and also the objective 41 in a second tube piece 42 acting as a mount. This tube piece 42 is also carried by the bearing sleeve 35. Large openings in the cylindrical support 12 serve to allow the access of the rays. Simultaneous observation of the mirror images of the different graduations on the graticule 38 is made possible by the prism arrangement in front of the objective 41. The prism arrangement consists of cemented prisms slips 43, 44, 45 and 46, 47, 48 in a housing 49 which is mounted on the objective mount 42.

In FIG. 2 the autocollimating telescope consists of the eyepiece 37, the graduation plate 38, a prism 39 in the tube 40 and the objective 41 in the tube 42. Both parts of the telescope are supported by the bushing 35, which can be rotated about the ring 11 of the outer gimbal, but can also be fixed by means of a screw (not shown) or be coupled with the cylindrical support portion 12 of the intermediate gimbal by another screw (not shown). The tube 42 supports in a case 49 a set of prisms 43, 44, 45, 46, 47 and 48, for observing the several mirrors. Mirrors 19 and 24 are connected to the two band clamps. Mirror 53 is connected with alidade pivot 50 of the theodolite 8, and is visible when coincident with partial prism 46. The horizontal circle 52 and mirror 31 are connected with the gyroscope 28. Mirror 31 is mounted upon the spin axis 30 of the gyro with its normal in alignment with the spin axis. It is a very effective check of misalignment if the image reflected by one plane mirror is sharp, which requires that all areas of the mirror have normals parallel to the spin axis and that the areas be within optical range of the autocollimating telescope.

Figure 4:
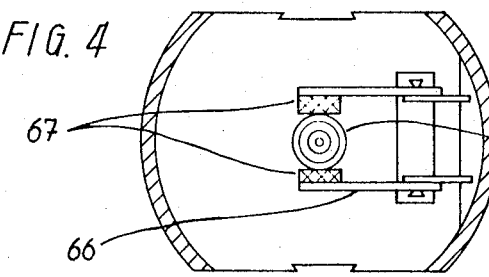
FIG. 4 is a section on the line IV—IV of FIG. 3.

In the embodiment of the invention in accordance with FIGS. 3 and 4 the gyro is carried in the inner frame 61 on a long carrying band 62 of rectangular cross section with a minimum restoring or directing moment. Coinciding with the vertical axis of the system there is a short wire 63 in the bottom part of the apparatus in the form of a tensioning band and ending in a mount 64. This mount 64 is held on its spherical part 65 by means of a rigid clamping device 66 with jaws 67 (see FIG. 4) which is fixed to the outer frame 68. The holding means is preferably to be so adjusted that the tension force, determined by the weight of the gyro, in the carrying band never under any circumstances decreases and also does not substantially increase. By means of a spring actuating means, for example by means of a wire the holding device can be opened so that the mount 64 can be released substantially without any jerk so that the suspension is freed.

The mount 64 is so constructed that the wire 63 is electrically insulated from the holding device. At the bottom the current conducting band or wire 69 with a minimum restoring force passes through the outside and its lower end is attached to a weak strip spring 70 on the outer side of the frame. If the upper mount 71 of the wire 63 and the lower mount 72 together with the upper mount 73 of the carrying band 62 are also electrically insulated from the gyro housing 61 and frame 68, it is possible to provide a convenient two-phase current supply to the gyro whose motor can then be made in the form of a two-phase motor or can be adapted for two-phase operation by means of a condenser. With the help of this construction it is possible to switch over from one measuring condition to another in such a manner that the force turning the band is altered. The alteration of the force turning the band is a provision which makes the use of a gyro motor with two or more fixed frequencies possible. For example, the increased force due to higher gyro motor frequencies can be offset by a greater band turning force allowing for a closer approximation of r.

In FIG. 3, the mirror 82 is, in a known manner, connected with a tube fixed above the gyro case 61. Its mirror normal is to be aligned with the gyro axis. In the case of changing from the first to the second stage after uncaging the lower band 63, the torsion torque zero position of the upper band should be turned from the position B of wider deflection of the meridian in a position near the meridian which is found by a circle reading and computation with r as a result of the measurement of the first stage. To save time, this change should be made with the gyro running. By the device 74, 75, 76, illustrated in FIGS. 6 and 7 and located near the lower clamp 72 of the upper band 62, the gyroscope may be engaged on the conical part 77 of the tube to be connected with the intermediate gimbal for rotating in the position near the meridian. If the alidade of the cooperating theodolite is now turned and fixed at the before-mentioned circle reading, the normal of the mirror 80 connected with the alidade axis and adjusted in alignment with the aiming axis of the theodolite telescope, represents this wanted position. Therefore, it is only required to use the autocollimating telescope 85 in conjunction with the prism body 84 to observe and then turn and fix the intermediate gimbal in a position in which the mirror images of a vertical marker line of the graduation plate of the autocollimating telescope coming from both the mirror 80 and the mirror 81 are in coincidence. Therefore, the autocollimating telescope is mounted on the outer gimbal to be turned with approximately horizontal aiming axis about the vertical axis. To turn the intermediate gimbal in an appointed position, it is desirable to couple the autocollimating telescope with the cylindrical support 78 in a position of coincidence between the vertical marker line of the graduation plate and its image reflected by mirror 81.

Similarly, the position of the mirror 83 will be observed during the first stage by means of the prism body 84. For observing the reversal points of gyroscope oscillations, it is required that the autocollimating telescope be turned to the coincidence between the marker line and its image reflected from the mirror 82 in each reversal position, and then to fix the autocollimating telescope to the outer gimbal and subsequently turn the alidade of the theodolite to a position of coincidence with the marker line which has is image reflected from the mirror 80. Now the circle reading can be seen and noted. The time for these operations must be shorter than the half period of the oscillation in order to still reach the next reversal position within the time alloted.

What I claim is:

1. In a gyro compass comprising an intermediate gimbal arranged in an outer gimbal so that said intermediate gimbal can rotate about an axis which is perpendicular to the surface of the Earth, a band system held in the intermediate gimbal, an inner gimbal suspended on the band system rotatable about the first-mentioned axis and swingable with respect thereto, a driven gyro rotor mounted in the inner gimbal rotatable about an axis perpendicular to the first-mentioned axis, the operating axis of the gyro arranged to swing about the first-mentioned axis so as to seek North, a mirror fixed on the inner gimbal, the normal of the plane surface of said mirror aligned perpendicular to the first-mentioned axis, and an autocollimating telescope swingable in relation to the outer gimbal and in relation to the intermediate gimbal about the first-mentioned axis, the improvement comprising, an inner gimbal suspension means of at least two sequential band systems, each of said systems having different restoring forces, and a mirror means mounted on said suspension means, said mirror means having a horizontal normal which by adjustment of said telescope can selectively be brought into coincidence with the optical path of said telescope.

2. A compass in accordance with claim 1 with means for selectively locking individual band systems, said means rigidly connecting said band systems to said intermediate gimbal.

3. A compass in accordance with claim 1 in which said sequential band systems are terminated at the bottom of the inner gimbal in said mount, said jaws being affixed to said outer gimbal and capable of rigidly clamping said spherical part.

4. A compass in accordance with claim 1 in which said sequential band systems include band heads at each end of a given band and means for holding a band head, with the uppermost band system having a band head at the lower end of said band system, located remotely from the terminal connection of the band systems to said inner gimbal, with means for selectively and rigidly holding said band head fixed with respect to the intermediate gimbal.

5. A compass in accordance with claim 1 in which the driven gyro rotor has changeable speed and means for varying the speed in accordance with the freeing and locking of the individual band systems.

6. A compass in accordance with claim 5 wherein the gyro is electrically powered with two different frequencies.

7. A compass in accordance with claim 1 further comprising a prism arrangement for conducting light from the mirrors to the autocollimating telescope.

8. A compass in accordance with claim 7 in which the prism arrangement also comprises a partial prism arranged to establish an optical connection between the theodolite to be aligned by the compass and the alidade pivot of the theodolite.

9. A compass in accordance with claim 8 further comprising a theodolite, and a mirror on the alidade pivot having its normal aligned with the axis of the sighting telescope of the theodolite.

10. A compass in accordance with claim 1 wherein the suspension means comprises upper and lower mounts for said band systems and a mirror means affixed to the band mounts of each band system, said mirror means having a horizontal normal which by adjustment of said telescope can selectively be brought into coincidence with the optical path of said telescope.

References Cited

UNITED STATES PATENTS

| 1,226,882 | 5/1917 | Henderson | 33—226 |
| 2,809,029 | 10/1957 | Christoph | 33—226 X |
| 3,077,672 | 2/1963 | Sasaki et al. | 33—226 |

FOREIGN PATENTS

| 1,008,282 | 10/1965 | Great Britain | 33—72 G |
| 187,328 | 2/1967 | U.S.S.R. | 33—72 G |

ROBERT B. HULL, Primary Examiner

U.S. Cl. X.R.

74—5.4; 33—226